United States Patent [19]

Simard et al.

[11] Patent Number: 5,436,590
[45] Date of Patent: Jul. 25, 1995

[54] DIGITAL FSK DEMODULATOR WITH AUTOMATIC OFFSET CANCELLATION

[75] Inventors: J. M. A. Frédéric Simard, Hull; William T. Ross, Dunrobin, both of Canada

[73] Assignee: Northern Telecom Limited, Montreal, Canada

[21] Appl. No.: 295,588

[22] Filed: Aug. 25, 1994

[51] Int. Cl.$^6$ .......... H03C 3/00; H04L 27/14
[52] U.S. Cl. ............ 329/303; 375/317; 375/334
[58] Field of Search ........ 329/300, 301, 302, 303; 375/45–51, 76, 80, 82, 88–91, 272–278, 317–319, 324, 325, 328, 334–337

[56] References Cited

U.S. PATENT DOCUMENTS

| | | | |
|---|---|---|---|
| 3,473,131 | 10/1969 | Perkins, Jr. | 375/76 X |
| 4,631,737 | 12/1986 | Davis et al. | 375/88 |
| 4,679,209 | 7/1987 | Hogeboom et al. | 329/311 X |
| 5,155,446 | 10/1992 | Eberle et al. | 329/300 |
| 5,222,078 | 6/1993 | Cason et al. | 375/76 |

FOREIGN PATENT DOCUMENTS

| | | | |
|---|---|---|---|
| 2905904 | 8/1980 | Germany | 375/76 |
| 0077659 | 6/1977 | Japan | 329/301 |

OTHER PUBLICATIONS

"*IBM Technical Disclosure Bulletin*", vol. 20, No. 2, Jul. 1977, Data Demodulator Circuit Arrangement, p. 769, Fiehmann et al.

*Primary Examiner*—David Mis
*Attorney, Agent, or Firm*—Yoshiharu Toyooka

[57] ABSTRACT

A digital FSK demodulator used in e.g. a telephone loop produces unequal amplitudes in detected mark and space tones. The inequality or offset must be cancelled so that a proper timing signal can be recovered from the FSK signal. The demodulator includes a digital compensation circuit for offset cancellation in which peak amplitudes of digital 0 and digital 1 signals are continuously monitored. The peak amplitudes are then averaged to obtain an offset estimation which is subtracted from the output of the demodulator for offset compensation.

7 Claims, 2 Drawing Sheets

DIGITAL FSK DEMODULATOR WITH AUTOMATIC OFFSET CANCELLATION

FIELD OF THE INVENTION

The present invention relates to a digital demodulator for FSK signals. More specifically, the demodulator uses a quadrature phase detector and includes a feature which allows automatic compensation of signal offset.

BACKGROUND OF THE INVENTION

FSK (frequency shift keying) is one of many widely used modulation techniques for digital data transmission. Often MODEMS are used to connect computers or other digital equipment over a transmission medium such as a telephone loop, coaxial cable, fiber optics, electromagnetic waves, etc.. Among many fields of application of FSK, voiceband FSK will be described in detail to show its characteristics. It should be noted that the invention is equally applicable to FSK demodulation in other areas. Voiceband FSK is used over telephone loops to transmit data between customers' premises equipment (CPE) and a switching office for local area signaling services. In this transmission, FSK signals are sent using mark and space tones whose frequencies are, for example, 1200 and 2200 Hz respectively and therefore lie in the voiceband. The FSK signals can be sent over a telephone loop while a customer's terminal, e.g. a telephone set, is either off-hook or on-hook. One popular use of FSK signals in the telephone environment is to display the telephone number of an incoming call on the customer's telephone set. Numerous other uses have been devised and can be conceived in future for this data transmission between CPE and switching office.

A digital FSK demodulator using a quadrature phase detector is described in U.S. Pat. No. 5,155,446 (Eberle et al), issued on Oct. 13, 1992. The demodulator of this patent comprises a highpass filter, a quadrature phase detector, and a lowpass filter. The demodulated output of the lowpass filter is fed to a UART (asynchronous receiver) for data recovery. This demodulator uses mainly a collection of shift registers for the filters and one multiplier for the quadrature phase detector. It is therefore very easy and economical to manufacture in a small IC chip. Generally speaking, the sampling rate is four times the average of the signaling tones. In the embodiment discussed in the patent, the mean value of the two signaling tones is 1700 Hz; therefore the sampling rate of the modulated signal is 6800 Hz. Assuming that the amplitude of each received tone is unity (an unrealistic assumption in practice), the sampling rate is set at 6800 Hz, the DC gain of the lowpass filter is 0 dB, and the lowpass filter completely eliminates the harmonic component in the quadrature demodulator output (the last also being unrealistic), then the output of the quadrature demodulator would be as shown in the table below.

| Signaling Frequency (Hz) | Normalized Radian Frequency $\omega$ (rad/s) | Corresponding Quadrature Output After Lowpass Filtering |
| --- | --- | --- |
| 1200 (mark) | 1.108797 | 0.2228692 |
| 2200 (space) | 2.032795 | −0.2228692 |

The positive value at the output of the quadrature demodulator (after lowpass filtering) corresponds to the mark frequency (1200 Hz), while the negative value corresponds to the space frequency (2200 Hz). However, because certain assumptions are unrealistic, it is necessary to consider the effect of non-ideal conditions. The levels of the received signaling tones are not equal due to many factors, a few of which are mentioned below.

MODEM Transmission
The MODEM may not necessarily transmit the tones at equal level.

Transmission Channel
The transmission channel attenuates each tone differently.

External Highpass Filtering
Provided to attenuate 60 Hz noise, this filter attenuates the mark tone more than the space tone.

$Sinc^2$ Decimation Filter
This filter has a lowpass characteristic attenuating the space tone more than the mark tone.

Digital Highpass Filtering
Like its external counterpart, this filter attenuates the mark frequency more than the space frequency.

As a result of the inequality in the amplitude of the received signaling tones, the quadrature outputs generated by each signaling tone no longer sum to zero, thereby creating an offset in the demodulator output. Since the zero crossings of the demodulator output determine the timing recovery in the asynchronous receiver, it is imperative that this offset be eliminated.

The present applicant's U.S. Pat. No. 5,394,109, issued on Feb. 28, 1995 describes an FSK demodulator which includes an offset estimation and cancellation feature. The patent teaches several different techniques for generating offset signals during on-hook and off-hook transmissions. The off-hook offset estimation techniques described in the patent make use of a data message format of voiceband FSK which is widely accepted by the industry for custom local area signaling services (CLASS). This data message format contains a minimum number of bits of continuous mark tone. One off-hook offset estimation technique described therein requires an on-hook offset value and an amplitude of the continuous mark tone, both of which must have been measured during a previous transmission. Another technique calls for only the previously measured amplitude of the continuous mark tone from which the amplitude of the space tone is estimated. In either technique, the offset estimation is based on the previously measured values and is performed once at the start of a message transmission. The present invention executes the offset estimation and cancellation continuously during the message transmission, requiring no training sequence.

OBJECTS OF THE INVENTION

It is therefore an object of the invention to provide a digital FSK demodulator which includes an automatic offset cancellation feature.

It is another object of the invention to provide a digital FSK demodulator which uses quadrature phase detection with an automatic offset cancellation feature.

It is a further object of the invention to provide a digital FSK demodulator which performs automatic offset estimation and cancellation during off-hook as well as on-hook message transmission.

SUMMARY OF THE INVENTION

Briefly stated, the invention is directed to a digital FSK demodulator which comprises a quadrature demodulator for digitally detecting an FSK signal to generate a detected FSK signal, offset estimate means for generating an offset signal indicative of an offset in the detected FSK signal, and means for applying the offset signal to the quadrature demodulator to compensate for the offset in the detected FSK signal. The invention is characterized in that the offset estimate means comprises detection means for continuously monitoring amplitudes of the detected FSK signal, and averaging means for averaging the amplitudes to generate the offset signal proportional to the offset in the detected FSK signal.

BRIEF DESCRIPTION OF THE DRAWINGS

For a more complete understanding of the invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
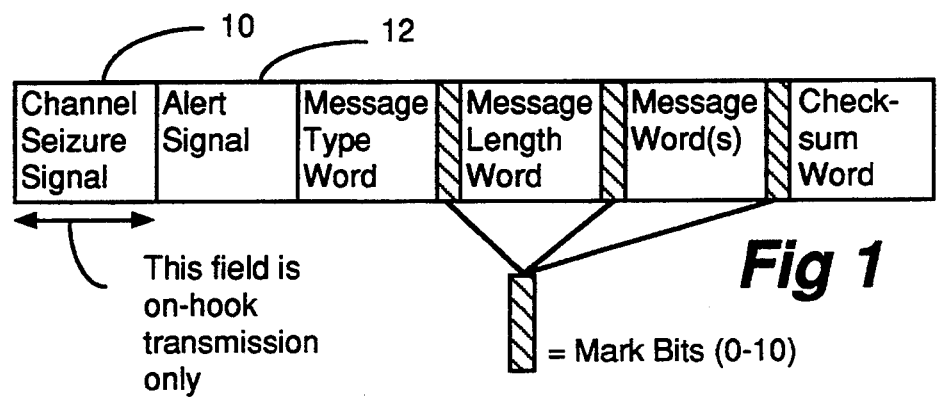
FIG. 1 is an illustration of a message format of digital data being transmitted in FSK.

FIG. 1 illustrates the single data message format of voiceband FSK currently being widely accepted by the industry for custom local area signaling services (CLASS). Some characteristics of the format are as follows:

Logical 1 (mark) and logical 0 (space) frequencies are nominally 1200 and 2200 Hz respectively.

Data format is serial, binary and asynchronous and the modulation is continuous phase binary frequency shift keying.

Each data word consists of an 8-bit byte; each data word is preceded by a start bit (space) and followed by a stop bit (mark), a total of 10 bits in a word.

The least significant bit of the byte is transmitted first.

The data signal is continuous and may contain up to 10 mark bits between data words.

Transmission of any 8-bit character is supported in the message word.

The channel seizure signal 10 is present during on-hook transmission only. It consists of 300 continuous bits of alternating space and mark, beginning with space and ending with mark.

The alert signal 12 consists of 180 bits (in on-hook transmission) and 80 bits (in off-hook transmission) of continuous mark. It should be noted that in the industry, "alert signal" is more commonly known as "mark signal" but in this specification the former is used to avoid confusion with the mark tone (2200 Hz) which is sometimes called mark signal or mark frequency.

The transmission rate is 1200 Baud.

Figure 2:
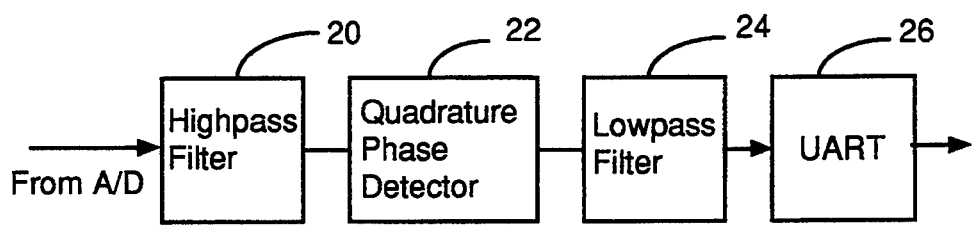
FIG. 2 is a functional block diagram of a digital FSK demodulator according to a prior patent.

FIG. 2 shows the digital demodulator according to the prior patent mentioned above. It comprises a highpass filter 20, a quadrature phase detector 22, and a lowpass filter 24. An analog FSK signal is converted to a digital signal by an A/D converter (not shown) which sends the converted digital signal to the highpass filter 20 as a demodulator input. The highpass filter attenuates 60 Hz power noise from the demodulator input. The quadrature phase detector 22 contains a shift register for delaying a digital input signal by one sample and then multiplies this received digital input y(n) by the previously received (and delayed by one sample) signal y(n−1) to generate a quadrature output. The lowpass filter 24 attenuates harmonics of the signaling frequencies in the quadrature output. The digital filters are made of shift registers and adders. The demodulated output of the lowpass filter is fed to a UART 26 for data decoding and recovery.

Figure 3:
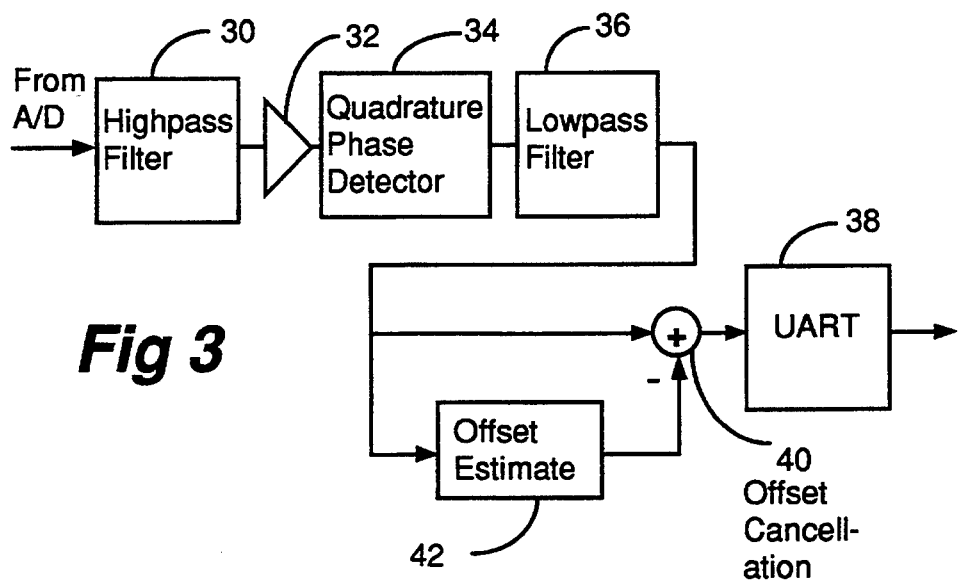
FIG. 3 is a functional block diagram of a digital demodulator with automatic off-hook offset estimation and cancellation according to one embodiment of the invention.

FIG. 3 shows a block diagram of the demodulator according to one embodiment of the present invention. The sampling rate in the embodiment is 6800 Hz because, as in the prior patent, the signaling tones are 1200 and 2200 Hz. The demodulator includes a highpass filter 30, a gain adjustment 32, a quadrature phase detector 34, a lowpass filter 36, and an asynchronous receiver (UART) 38. The functions of these elements are the same as those described in the aforementioned patent, except for the gain adjustment which is included to compensate the loss inherent in long subscriber loops. The gain adjustment is performed at the start of every off-hook and on-hook transmission. The demodulator further includes an offset cancellation block 40 which is a subtractor (or a negative adder) to subtract an offset signal from a lowpass filter output. An offset estimate block 42 produces the off-hook offset signal.

Offset Estimation

In general, the offset $\phi$ at the output of the lowpass filter may be approximated by the following expression:

$$\phi \approx K \frac{\cos\omega}{4} (A_1^2 - A_0^2)$$

where K is the product of DC gain and magnitude response at 600 Hz of the lowpass filter after quadrature; $\cos\omega = 0.4457384$ and $A_1$, $A_0$ are respectively the amplitudes of the mark and space signaling tones at the input to the quadrature phase detector. The demodulator offset therefore can be adequately estimated by averaging the peak value of the quadrature output corresponding to each tone and the offset must be estimated as the signal is demodulated. This procedure consists of tracking the peak maximum (corresponding to the mark tone) and peak minimum (corresponding to the space tone), and then averaging the two peaks.

Figure 4:
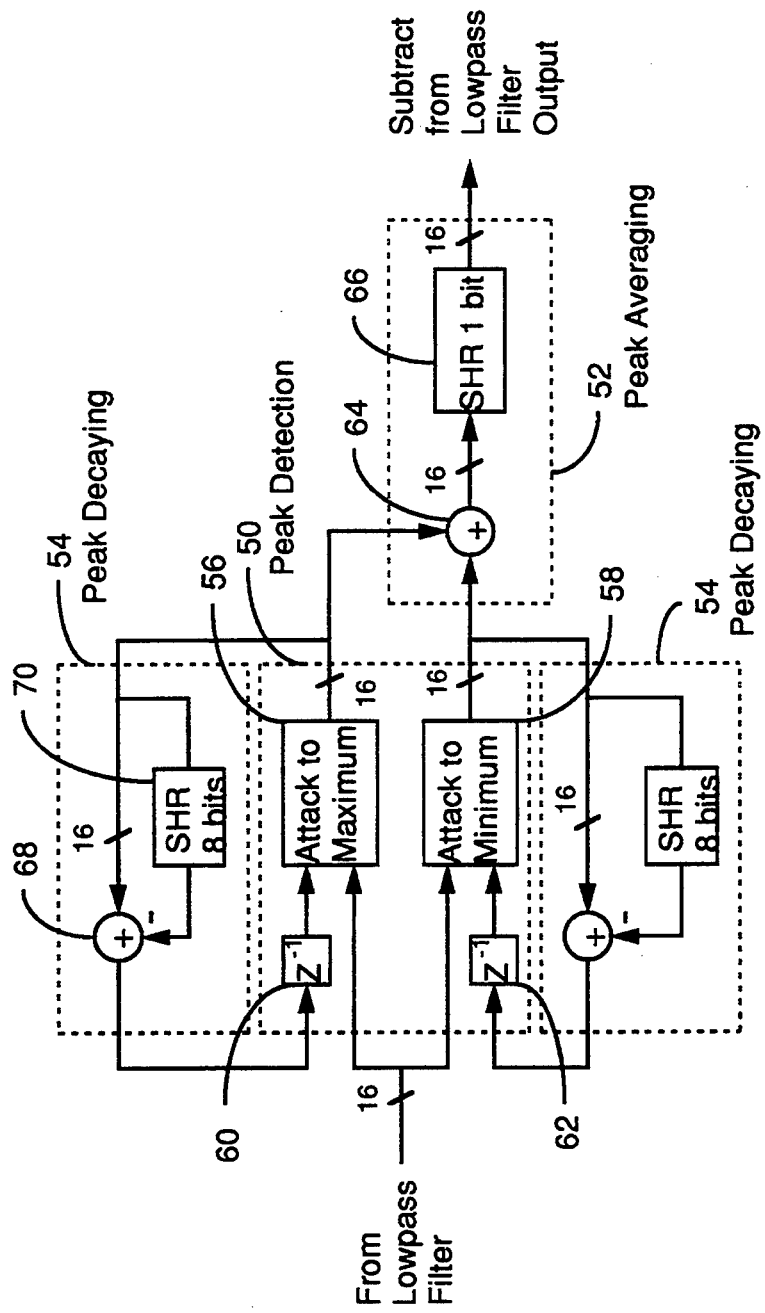
FIG. 4 is a functional block diagram of an automatic off-hook offset estimation circuit according to an embodiment of the invention.

FIG. 4 shows in block diagram the offset estimation circuit according to one embodiment of the invention. The circuit consists of a peak detection block 50, peak averaging block 52 and two peak decaying blocks 54. The output of the lowpass filter is applied to both an attack to maximum block 56 and to an attack to minimum block 58 because two peaks are to be detected, one for the positive lowpass filter outputs (mark tone) and one for the negative lowpass filter outputs (space tone). The peak values are 16-bit numbers and upon circuit initialization they should be set to zero. At the attack to maximum and minimum blocks 56 and 58, peak detection for each tone simply consists of comparing the current lowpass filter output with the peak value stored in block 60 or 62. In the case of the positive peak, if the current sample is greater than the stored positive peak, the current sample is sent to the peak averaging block 52. The stored positive peak is then updated by the average of the current sample and the stored positive peak. In the case of the negative peak, if the current sample is smaller than the stored negative peak, the current sample is sent to the peak averaging block 52. The stored negative peak is then updated by the average of the current sample and the stored negative peak. The averaging for stored peak updating is used to somewhat dampen the attack rate because it provides some noise immunity while still being sufficiently responsive to detect the start bit of the first byte.

Once the peaks are detected they are sent to the peak averaging block 52. In the block they are averaged by summing them at 64 and shifting the sum right by one bit (to divide by 2) at 66. Overflow is not an issue since the summands have opposite polarity. The right shift should be performed with sign-bit extension.

After peak averaging, the peaks should be decayed to provide some recovery from noise spikes. This requires that each peak be multiplied by a decay factor k. The value of the decay factor is determined by the following considerations. The longest sequence length of a given bit is nine bits (the start bit followed by nine mark bits or nine space bits followed by the stop bit). Given a 6800 Hz sampling rate and 1200 Baud information rate, nine bits correspond to 51 samples. The decay factor is then chosen so that in the worst case, the peak value has decayed to 80% of its initial value. Therefore, $k=0.8^{1/51}=0.99563$, which is adequately approximated by $(1-2^{-8})$.

In FIG. 4, the peak decaying block therefore includes a subtractor 68 and an 8-bit shifter 70. One peak decaying block is provided for each attack to maximum block 56 and the attack to minimum block 58. The stored peak is shifted right by 8 bits (with the upper byte being set to the peak's sign bit) by the shifter 70. The shifted value is subtracted from (negatively added to) the stored peak. The peak decaying block for the negative peak is identical to that of the positive peak. Again, overflow is not an issue, however, underflow is expected to limit the amount of decay which is possible. The off-hook gain adjustment may be provided to prevent spurious decaying results from being generated by the underflow.

This circuit adaptively estimates the demodulator offset continuously during the message. In the techniques described in the present applicant's aforementioned U.S. patent, storage means is used to retain values of a prior on-hook transmission. A subsequent off-hook offset estimation is performed using the stored values on the assumption that parameters should not have deviated much from the previous transmission. In the present invention, however, no assumption of a prior on-hook transmission is made and therefore off-hook gain adjust is desirable. As described above in conjunction with the peak decay, low receive levels may adversely impact the performance of the offset estimation circuit. The gain adjustment circuit begins by determining a peak amplitude. Once this is complete, it computes the number of left shifts which can be performed without clipping (maximum possible gain adjustment). Furthermore, because during off-hook transmission the gain adjustment circuit monitors the mark signal, it is also desirable to provide an additional bit of headroom to the number of left shifts to account for the fact that the mark signal produces a lower output than the space signal because of the highpass filter.

The offset estimation circuit should not run until the demodulator impulse response has settled because the transients inherent in the impulse response adversely affect the short-term performance of the circuit. To this end, the offset estimation circuit must be idle during the demodulator settling time, which is nine samples (two samples for the highpass filter and seven samples for the lowpass filter). In order to provide some margin for A/D settling, it is necessary to leave this circuit idle during the 20 samples following the start of the demodulator. This still allows ample time for the estimation circuit to adapt to the current transmission conditions.

Upon startup, both peaks are set to 0. In the normal course of operation, a mark signal is initially applied to the demodulator which will allow the circuit to attack the positive peak. However, the negative peak will remain uninitialized (still 0). During the interval in which one of the peaks is uninitialized, the peak averaging should provide one extra right shift, effectively implementing a peak-divide-by-4 function. Once both peaks are initialized, peak averaging must proceed normally (divide-by-2). This step was found to improve the circuit's noise immunity.

What is claimed is:

1. In a digital FSK demodulator which comprises a quadrature demodulator for digitally detecting an FSK signal to generate a detected FSK signal; offset estimate means for generating an offset signal indicative of an offset in the detected FSK signal; and means for applying the offset signal to the quadrature demodulator to compensate for the offset in the detected FSK signal; the invention being characterized in that the offset estimate means comprises:

a maximum detection means for continuously monitoring the maximum amplitude of the detected FSK signal;

a minimum detection means for continuously monitoring the minimum amplitude of the detected FSK signal;

storage means for storing the maximum and minimum amplitudes;

peak decay means connected to the maximum and minimum detection means to adjust stored maximum and minimum amplitudes, each of the peak decay means comprising a multiplier means having a predetermined multiplication factor; and averaging means for averaging the amplitudes to generate the offset signal proportional to the offset in the detected FSK signal.

2. The digital FSK demodulator according to claim 1, wherein peak decay means comprises a shift register for shifting a predetermined number of bits to the right.

3. The digital FSK demodulator according to claim 1, wherein the quadrature demodulator further includes a gain adjustment circuit.

4. The digital FSK demodulator according to claim 1, wherein the FSK signal consists of a series of digital 0 and digital 1 and the quadrature demodulator produces a positive output for either digital 0 or digital 1 and a negative output for the other digital 0 or digital 1.

5. The digital FSK demodulator according to claim 4, wherein the FSK signal consists of a series of mark and space tones used in a voice band telephone circuit.

6. The digital FSK demodulator according to claim 5, wherein the quadrature demodulator further includes a gain adjustment circuit.

7. The digital FSK demodulator according to claim 1, wherein the averaging means comprises a summing means and a shift register for shifting bits to effect a divide-by-2 function.

* * * * *